US012645530B2

(12) United States Patent

Bieske et al.

(10) Patent No.: US 12,645,530 B2
(45) Date of Patent: Jun. 2, 2026

(54) METHOD AND SYSTEM FOR HANDLING DATA VALUES AND STRUCTURE IN A MEMORY

(71) Applicant: OVH, Roubaix (FR)

(72) Inventors: Michel Bieske, Wasquehal (FR); Florian Pourry, Roubaix (FR); Bastien Cecchinato, Villeurbanne (FR)

(73) Assignee: OVH, Roubaix (FR)

( * ) Notice: Subject to any disclaimer, the term of this patent is extended or adjusted under 35 U.S.C. 154(b) by 132 days.

(21) Appl. No.: 18/513,877

(22) Filed: Nov. 20, 2023

(65) Prior Publication Data

US 2024/0168843 A1 May 23, 2024

(30) Foreign Application Priority Data

Nov. 21, 2022 (EP) ..................................... 22306714

(51) Int. Cl.
  *G06F 11/10* (2006.01)
  *G06F 11/07* (2006.01)
(52) U.S. Cl.
  CPC ...... *G06F 11/1004* (2013.01); *G06F 11/0772* (2013.01); *G06F 11/1068* (2013.01)
(58) Field of Classification Search
  CPC ............. G06F 11/0772; G06F 11/1004; G06F 11/1068; G06F 9/4493
  See application file for complete search history.

(56) References Cited

U.S. PATENT DOCUMENTS

| | | | |
|---|---|---|---|
| 12,008,259 B1* | 6/2024 | Petersen | ............... G06F 3/0604 |
| 2006/0218538 A1* | 9/2006 | van Kesteren | ............ G06F 8/52 |
| | | | 717/137 |
| 2007/0299863 A1* | 12/2007 | Fu | ......................... G06F 9/4493 |
| | | | 707/999.102 |
| 2022/0075791 A1* | 3/2022 | Karlberg | ................. G06F 16/13 |

OTHER PUBLICATIONS

European Search Report with regard to the counterpart EP Patent Application No. 22306714.1 completed Apr. 13, 2023.
"What is your strategy to save non volatile data?", Aug. 16, 2016 (Aug. 16, 2016), XP093038517, Retrieved from the Internet: URL:https://www.embeddedrelated.com/showthread/comp.arch. embedded/213853-1.php [retrieved on Apr. 12, 2023], 7 pages.

* cited by examiner

*Primary Examiner* — Shelly A Chase
*Assistant Examiner* — Enamul M Kabir
(74) *Attorney, Agent, or Firm* — BCF LLP

(57) ABSTRACT

A method and system allow to store and retrieve data values and data structure in a memory of an embedded system, the memory also storing executable code uploaded to the embedded system by a first external system through a first version of a firmware. A serializer is configured to receive from the executable code, sizes of data, corresponding to a number of chunks of the data, together with values of the chunks, to form a series of bytes therewith through concatenation, to calculate a total size of the series of bytes, and to write to the memory, successively the total size and the formed series of bytes. A deserializer is configured to read from the memory, successively a total size and a series of bytes, to deconcatenate the series of bytes into successively sizes of data, corresponding to a number of chunks of the data, together with values of the chunks, and to send the same to the executable code.

7 Claims, 6 Drawing Sheets

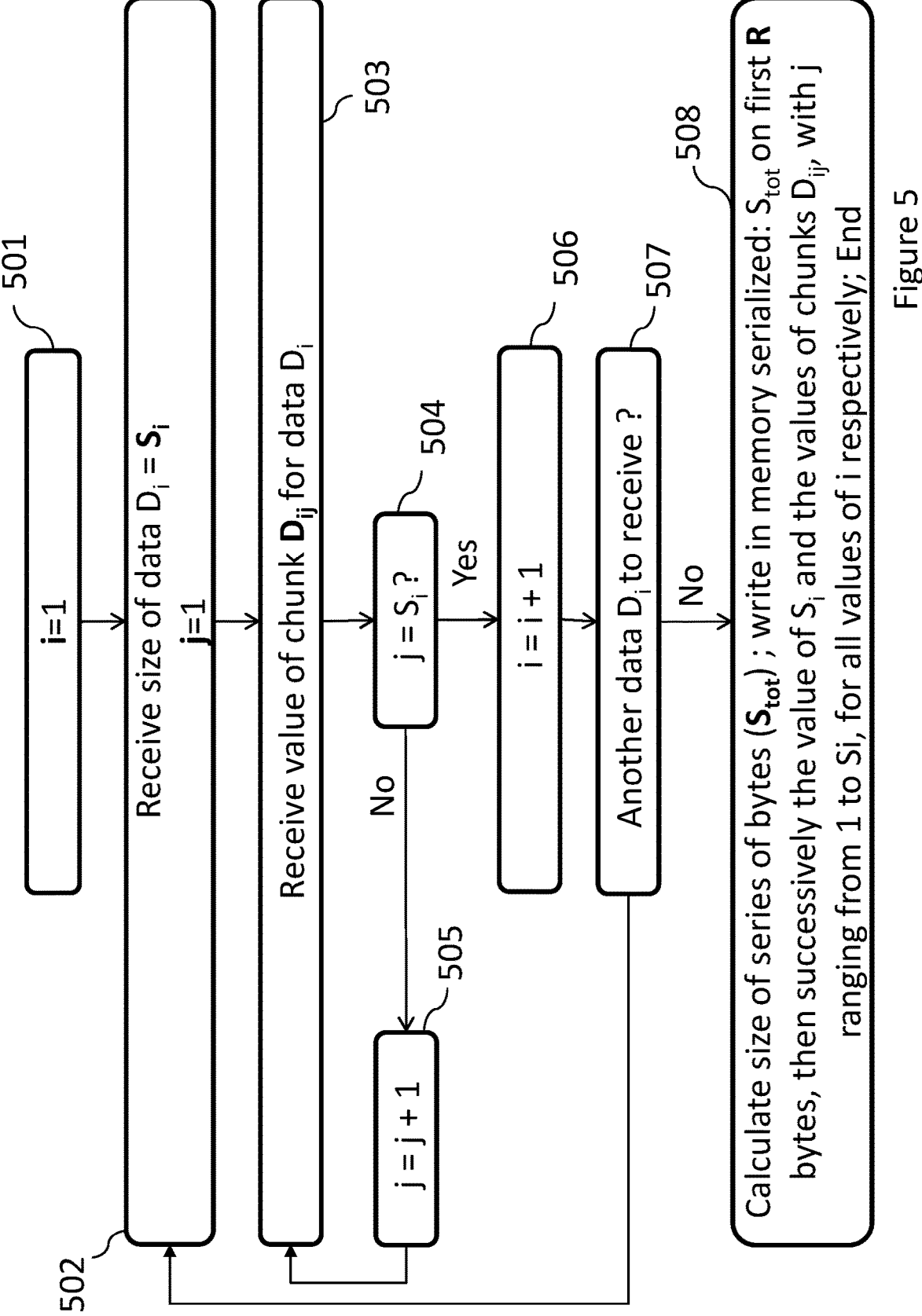

501 i=1

502 Receive size of data $D_i = S_i$
$j=1$

503 Receive value of chunk $D_{ij}$ for data $D_i$

504 $j = S_i$ ?

No → 505 $j = j+1$

Yes → 506 $i = i+1$

507 Another data $D_i$ to receive ?

No →

508 Calculate size of series of bytes ($S_{tot}$) ; write in memory serialized: $S_{tot}$ on first R bytes, then successively the value of $S_i$, and the values of chunks $D_{ij}$, with j ranging from 1 to Si, for all values of i respectively; End

Figure 5

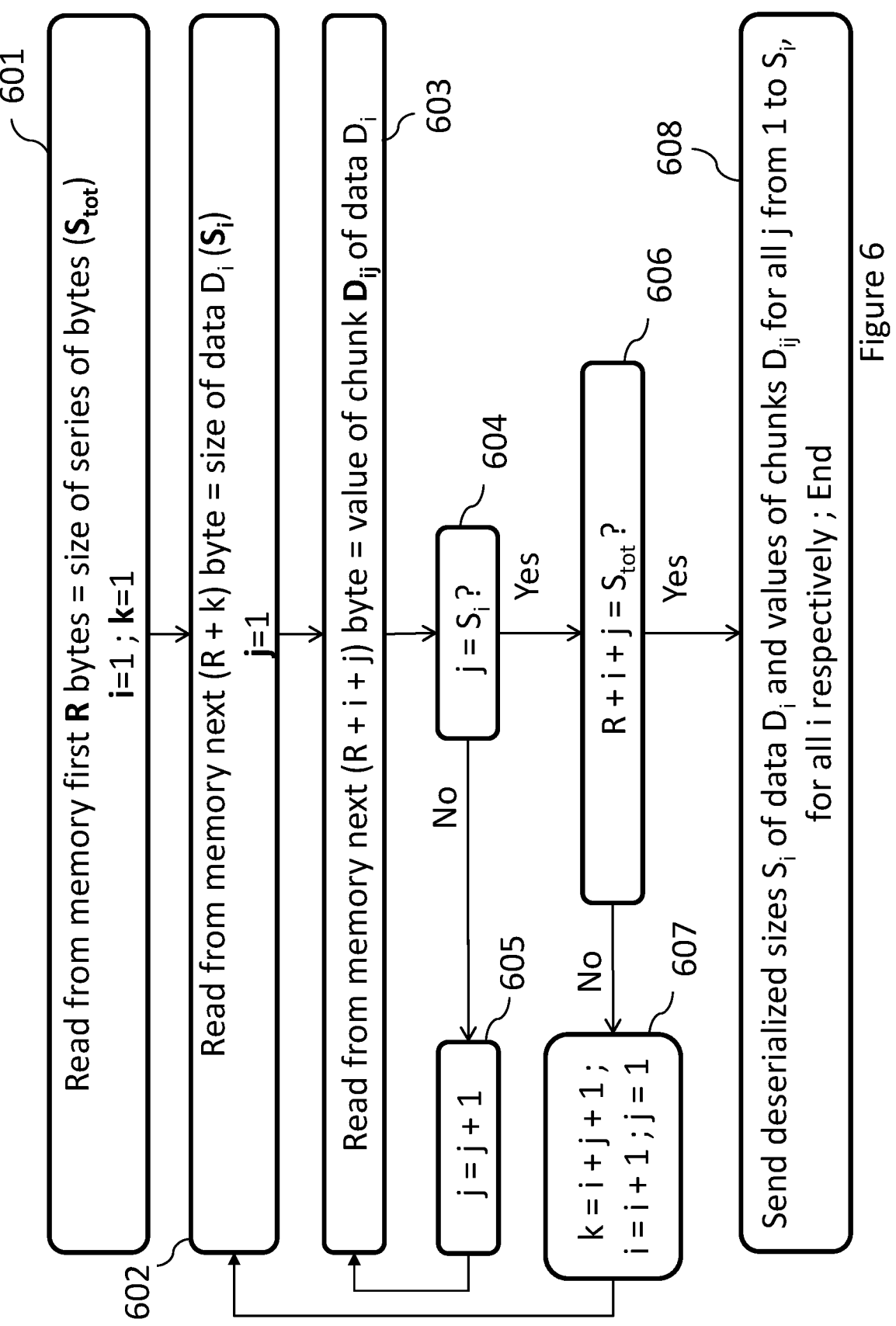

Read from memory first R bytes = size of series of bytes ($S_{tot}$)
$i=1$ ; $k=1$ — 601

Read from memory next $(R + k)$ byte = size of data $D_i$ ($S_i$)
$j=1$ — 602

Read from memory next $(R + i + j)$ byte = value of chunk $D_{ij}$ of data $D_i$ — 603

$j = S_i$? — 604

No → $j = j + 1$ — 605

Yes → $R + i + j = S_{tot}$? — 606

No → $k = i + j + 1$ ;
$i = i + 1$ ; $j = 1$ — 607

Yes → Send deserialized sizes $S_i$ of data $D_i$ and values of chunks $D_{ij}$ for all j from 1 to $S_i$,
for all i respectively ; End — 608

Figure 6

METHOD AND SYSTEM FOR HANDLING DATA VALUES AND STRUCTURE IN A MEMORY

CROSS-REFERENCE TO RELATED APPLICATIONS

The present application claims priority to European Patent Application No. 22306714.1, entitled "METHOD AND SYSTEM FOR HANDLING DATA VALUES AND STRUCTURE IN A MEMORY", filed on Nov. 21, 2022, the entirety of which is incorporated by reference herein.

FIELD

The present technology relates to handling data values and structure in a memory, and more particularly to a method and system for storing serialized data values and data structure in the memory, and retrieving deserialized data values and data structure from the memory.

BACKGROUND

The executable code uploaded as part of firmware to an embedded system, as defined below, may map, at runtime, data values and structure onto an unstructured memory within the embedded system. Such data values and structure may however need to change over successive versions to the firmware, for example, data may need to be added or deleted, or ordered differently in the data structure. Also, data values may need to be altered and stored into the memory, by the executable code, including upon commands sent to the executable code by systems external to the embedded system, that are not aware of the data structure. A method and system are therefore needed to ensure compatibility between successive versions of firmware that may host a different data structure, and with external systems that may attempt to update data values.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art. In particular, various aspects of the present technology provide a method to store data values and data structure in a memory of an embedded system, the memory also storing executable code uploaded to the embedded system by a first external system through a first version of a firmware, the method comprising:
  receiving at a serializer, from the executable code, with i ranging from 1 to a maximum number of data:
  the size, $S_i$, of a data, $D_i$, the size $S_i$ corresponding to a number of chunks, $D_{ij}$, forming the data $D_i$, with j ranging from 1 to $S_i$; and
  for each data $D_i$, the value for each of the chunks $D_{ij}$;
  forming by the serializer a series of bytes, obtained through concatenation of successively $S_i$ and $D_{ij}$, with j ranging from 1 to $S_i$, for i ranging from 1 to the maximum number of data;

calculating a total size, $S_{tot}$, as the sum of bytes in the formed series of bytes, plus a predetermined number of bytes, R; and
writing by the serializer, to the memory, successively the total size $S_{tot}$ on R bytes, and the formed series of bytes.
The method, in certain aspects, further comprises:
adding to the total size $S_{tot}$ a number of bytes, R', R' being a predetermined number of bytes;
calculating a CRC on the total size $S_{tot}$ on R bytes, and the formed series of bytes; and
appending by the serializer the CRC on R' bytes, to the total size $S_{tot}$ on R bytes, and the formed series of bytes written to the memory.
In aspects of the method, the CRC is calculated by the serializer.
In other aspects of the method, the CRC is calculated by the executable code and transmitted to the serializer.
In aspects of the method, the total size $S_{tot}$ is calculated by the serializer.
In other aspects of the method, the total size $S_{tot}$ is calculated by the executable code and transmitted to the serializer.
In aspects of the method, a subsequent second version of the firmware uploads to the embedded system executable code whereby the maximum number of data is modified.
In aspects of the method, a subsequent second version of the firmware uploads to the embedded system executable code whereby the sizes $S_i$, the data $D_i$, and the values of the chunks $D_{ij}$ are identical to those transmitted to the serializer by the executable code of the first version of the firmware, but the order in which they are transmitted to the serializer by the executable code of the second version of the firmware is different.
In aspects of the method, a second external system transmits to the executable code a data, $D'_i$, of a size, $S'_i$, corresponding to a number of chunks, $D'_{ij}$, the method further comprising receiving at the serializer, from the executable code, with i ranging from 1 to the maximum number of data:
  the size $S_i$ of the data $D_i$, and the value for each of the chunks $D_{ij}$;
  wherein for one of the i, the size $S_i$ of the data, $D_i$, and the value for each of the chunks $D_{ij}$ is replaced by the size $S'_i$ of the data $D'_i$, and the value for each of the chunks $D'_{ij}$.
Various aspects of the present technology also provide a method to retrieve data values and data structure from a memory of an embedded system, the memory also storing executable code uploaded to the embedded system by an external system through a firmware, the method comprising:
  reading at a deserializer, from the memory, successively a total size $S_{tot}$ on first R bytes, R being a predetermined number of bytes, and a series of bytes on next ($S_{tot}$–R) bytes;
  deconcatenating by the deserializer the series of bytes into successively a size, $S_i$, of a data, $D_i$, the size $S_i$ corresponding to a number of chunks, $D_{ij}$, forming the data $D_i$, with j ranging from 1 to $S_i$, and values of the chunks $D_{ij}$ for the data $D_i$, with i ranging from 1 to a maximum number of data; and
  sending by the deserializer to the executable code, the size $S_i$ of each data $D_i$, and for each data $D_i$, the values for each of the chunks $D_{ij}$ forming the data $D_i$, with j ranging from 1 to $S_i$, for all i respectively.
The method, in certain aspects, further comprises:
  reading at the deserializer, from the memory, a CRC on a predetermined number of bytes, R', after the series of bytes;

calculating a CRC' on the total size $S_{tot}$ on R bytes, and the
series of bytes;
comparing the values of the read CRC and the calculated
CRC', and if they are not identical, raising an alert.
In other aspects of the method, the calculating the CRC', the
comparing the values of the read CRC and the calculated
CRC', and the raising an alert, is performed at the deserializer.
In other aspects of the method, the read CRC is transmitted
by the deserializer to the executable code, and the calculating the CRC', the comparing the values of the read CRC and
the calculated CRC', and the raising an alert, is performed at
the executable code.

Various aspects of the present technology also provide a
system to store and retrieve data values and data structure in
a memory of an embedded system, the memory also storing
executable code uploaded to the embedded system by an
external system through a firmware, the system comprising:
a serializer configured to:
receive from the executable code, with i ranging from 1
to a first maximum number of data:
the size, $S_i$, of a data, $D_i$, the size $S_i$ corresponding to a
number of chunks, $D_{ij}$, forming the data $D_i$, with j
ranging from 1 to $S_i$; and
for each data $D_i$, the value for each of the chunks $D_{ij}$;
form a first series of bytes, obtained through concatenation of successively $S_i$ and $D_{ij}$, with j ranging from 1 to
$S_i$, for i ranging from 1 to the first maximum number of
data; and
write to the memory, successively a total size $S_{tot}$ on R
bytes, R being a predetermined number of bytes, and
the formed first series of bytes; and
a deserializer configured to:
read from the memory, successively a total size $S'_{tot}$ on
first R bytes, and a second series of bytes on next
$(S'_{tot}-R)$ bytes;
deconcatenate the second series of bytes into successively
a size, $S'_i$, of a data, $D'_i$, the size $S'_i$ corresponding to a
number of chunks, $D'_{ij}$, forming the data $D'_i$, with j
ranging from 1 to $S'_i$, and values of the chunks $D'_{ij}$ for
the data $D'_i$, with i ranging from 1 to a second maximum number of data; and
send to the executable code, the size $S'_i$ of each data $D'_i$,
and for each data $D'_i$, the values for each of the chunks
$D'_{ij}$ forming the data $D'_i$, with j ranging from 1 to $S'_i$, for
all i respectively;
the system being further configured to calculate the total
size, $S_{tot}$, as the sum of bytes in the formed first series of
bytes, plus R bytes.

Various aspects of the present technology also a computer-readable medium comprising instructions which,
when executed, cause the computer to perform any of the
methods and their various aspects above.

In the context of the present specification, the expression
"FPGA" is intended to include Field Programmable Gate
Array computing systems, available on the market at the
time of filing this patent application, such as references
Xilinx VU9P, or Intel Stratix V, and any subsequent equivalent technologies becoming available, regardless of their
name, consisting in computing system hardware programmable with software.

In the context of the present description, unless expressly
provided otherwise, a "processor" refers to, but is not
limited to, any type of "computing system", "electronic
device", "computer-based system", "controller unit", "monitoring device", "server", "microcontroller" and/or any combination thereof appropriate to the relevant task at hand, in relation to receiving, storing, processing, and/or forwarding
data. A processor may include a single dedicated processor,
a single shared processor, or a plurality of individual processors, some of which may be shared. A processor may be
a general purpose processor, such as a central processing
unit (CPU), a processor dedicated to a specific purpose, or
a processor implemented in a FPGA. Other hardware and
software, conventional and/or custom, may also be included
in a "processor".

In the context of the present description, unless expressly
provided otherwise, an "embedded system" refers to a
combination of computing system hardware, software and
firmware designed for a specific function, whether standalone or as part of a larger system, that generally comprises
a processor, a memory to store code executable by the
processor, and data consumed, and/or produced, by the
processor when executing the executable code, and an
input/output interface which may connect to, for example
and without limitations, sensors, actuators, user interfaces
and/or other processors.

In the context of the present description, unless expressly
provided otherwise, "firmware" refers to, but is not limited
to, any type of code executable by a processor, and uploaded
to a memory readable by the processor. The executable code
may include information of data, and/or of structure of such
data, stored in the memory, and consumed, and/or produced,
by the processor when executing the executable code.

In the context of the present description, unless expressly
provided otherwise, the expression "memory" is intended to
include Random Access storage systems, available on the
market at the time of filing this patent application, and any
subsequent equivalent technologies becoming available,
regardless of their name, consisting in computing system
media for storing digital information. An example of such
memory may be a Quad Data Rate (QDR) Static Random
Access Memory (SRAM).

In the context of the present description, the functional
steps shown in the figures, may be provided through the use
of dedicated hardware, as well as hardware capable of
executing software in association with appropriate software.

Still in the context of the present description, "a" computer-readable medium and "the" computer-readable
medium should not be construed as being the same computer-readable medium. To the contrary, and whenever
appropriate, "a" computer-readable medium and "the" computer-readable medium may also be construed as a first
computer-readable medium and a second computer-readable
medium.

In the context of the present description, unless expressly
provided otherwise, the words "first", "second", "third", etc.
have been used as adjectives only for the purpose of allowing for distinction between the nouns that they modify from
one another, and not for the purpose of describing any
particular relationship between those nouns.

Implementations of the present technology each have at
least one of the above-mentioned objects and/or aspects, but
do not necessarily have all of them. It should be understood
that some aspects of the present technology that have
resulted from attempting to attain the above-mentioned
object may not satisfy this object and/or may satisfy other
objects not specifically recited herein.

Additional and/or alternative features, aspects and advantages of implementations of the present technology will
become apparent from the following description, the accompanying drawings and the appended claims.

BRIEF DESCRIPTION OF THE DRAWINGS

For a better understanding of the present technology, as
well as other aspects and further features thereof, reference is made to the following description which is to be used in conjunction with the accompanying drawings, where:

FIG. 5 illustrates an example of method steps that may be executed by a serializer according to the present technology; and FIG. 6 illustrates an example of method steps that may be executed by a deserializer according to the present technology.

It should be noted that, unless otherwise explicitly specified herein, the drawings are not to scale. Finally, elements that are identical from one drawing to the other bear the same numeral reference across drawings.

DETAILED DESCRIPTION

Figure 1:
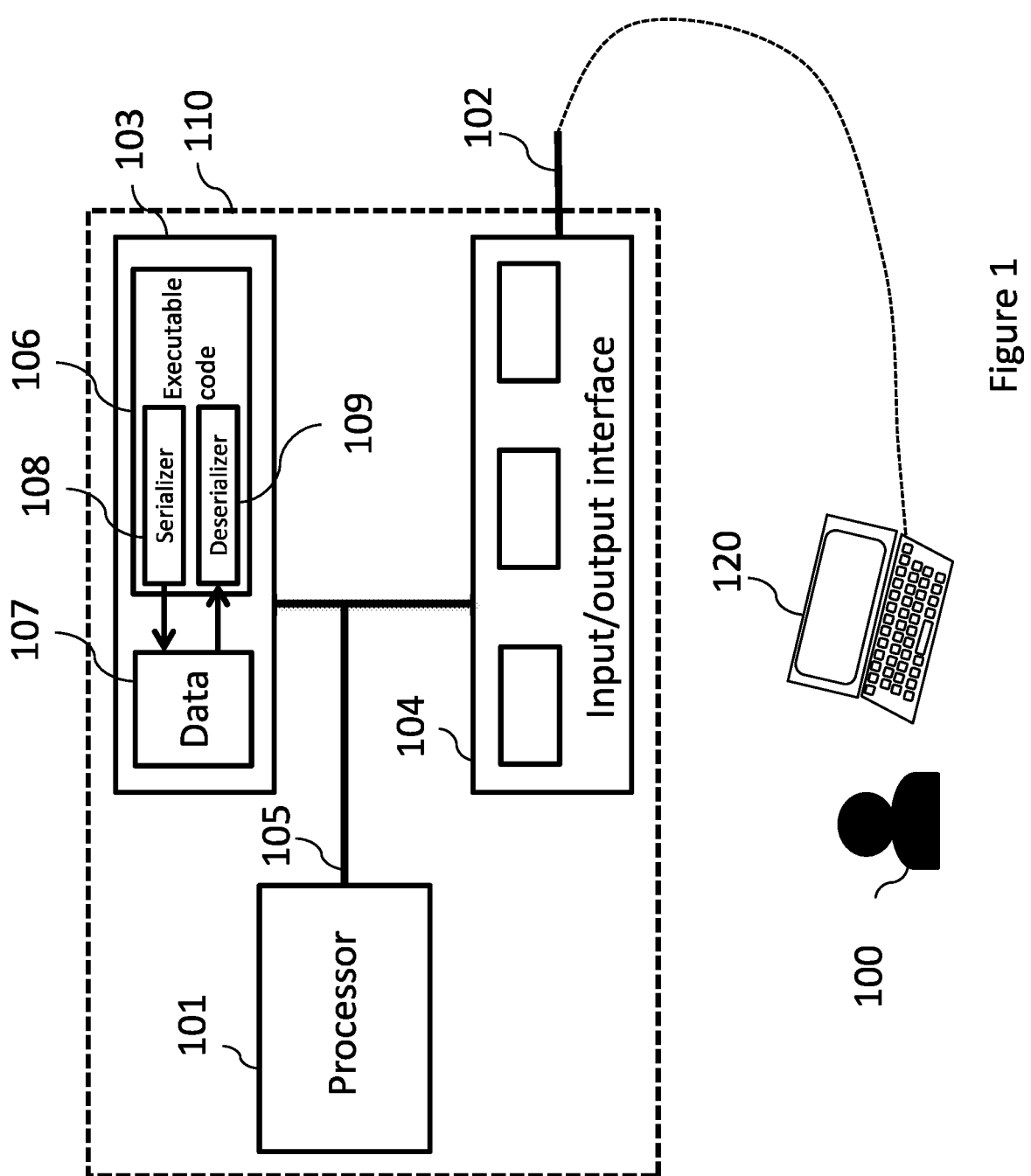
FIG. 1 illustrates an environment where the present technology may be used.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some aspects of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process or method steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates an environment where the present technology may be used. An Embedded system 110 may for example comprise various hardware components including a Processor 101, a Memory 103 and an Input/output interface 104. In this context, the Processor 101 may or may not be included in a FPGA. The Processor 101 may be an "off the shelf" generic computing system. In some aspect, the Processor 101 may also be distributed amongst multiple computing systems. As a person skilled in the art may appreciate, multiple variations as to how the Processor 101 is implemented may be envisioned without departing from the scope of the present technology.

Communication between the various components of the Embedded system 110 may be enabled by one or more internal and/or external Buses 105 (e.g. a PCI bus, universal serial bus, IEEE 1394 "Firewire" bus, SCSI bus, Serial-ATA bus, ARINC bus, etc.), to which the various hardware components are electronically coupled.

The Input/output interface 104 may enable networking capabilities such as wire or wireless access. As an example, the Input/output interface 104 may comprise a networking interface such as, but not limited to, a network port, a network socket, a network interface controller and the like. The person skilled in the art will both be capable of devising multiple examples of how the networking interface may be implemented, and appreciate that any part of the Input/output interface 104 may also physically reside outside of the Embedded system 110, still within the scope of the present technology.

The Memory 103 may store Executable code 106, such as for example, a library, an application, etc. suitable for being uploaded into the Memory 103 and executed by the Processor 101, to enable Embedded system 110 to perform given functions. The Memory 103 may also store Data 107 consumed, and/or produced, by the Processor 101. As explained below, as part of the Executable code 106, a Serializer 108 may be used, to store at least certain of the Data 107 and/or their data structure onto the Memory 103, and a Deserializer 109 may be used, to retrieve at least certain of the Data 107 and/or their data structure from the Memory 103.

The person skilled in the art will appreciate that any part of the Memory 103 may also physically reside outside of the Embedded system 110, and that the Embedded system 110 may be implemented in any other suitable hardware, software, and/or firmware, or a combination thereof, and may be a single physical entity, or several separate physical entities with a distributed functionality, still within the scope of the present technology.

The Input/output interface 104 may allow Embedded system 110 to be communicably connected, through a Connection 102, to other processors, such as a Computing system 120, that may be used by a User 100. As will be appreciated by the person skilled in the art, the digital communication hardware and protocol used for Connection 102 may be of any type.

User 100 may for example use the Computing system 120 to prepare and upload successive versions of firmware to the Embedded system 110. Connection 102 may also be used, by Computing system 120 or any other computing system, to enter commands understood by the Executable code 106. For example, commands may be to set particular values to certain of Data 107.

As a first example, let us assume the firmware uploaded to the Embedded system 110 needs to store in the Memory 103 the following information relative to data:

a data $D_1$, with one field with a value $D_{11}$ of 255, and
a data $D_2$, with eight fields $D_{21}$ to $D_{29}$ with a value each of respectively 1, 2, 3, 4, 5, 6, 7 and 8.

This information is therefore composed of information related to the data structure (data $D_1$ with one field, data $D_2$ with eight fields), and the data values.

Figure 2:
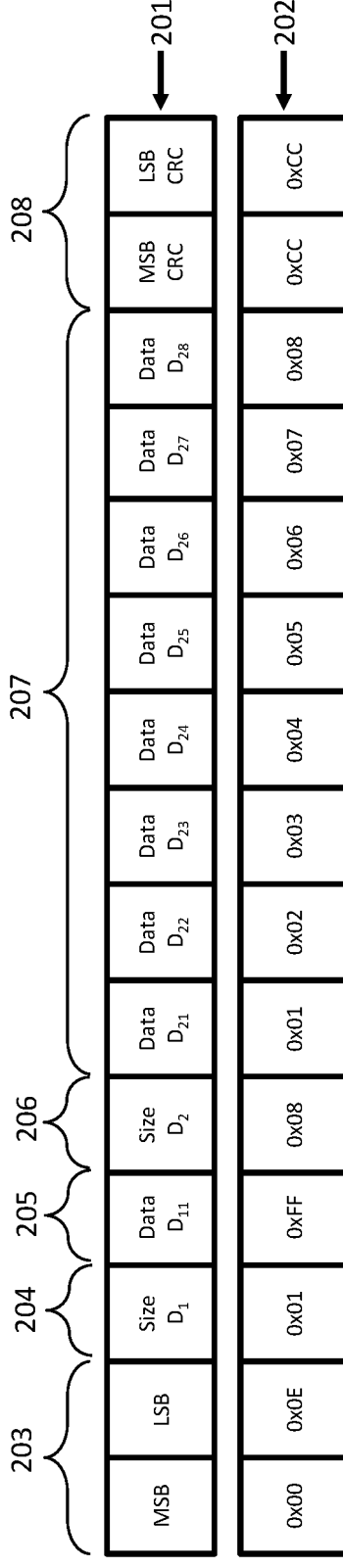
FIG. 2 provides an example of a series of memory data, as part of firmware to be uploaded to an embedded system.

According to the present technology, the firmware uploaded to the Embedded system 110 may include a Serializer 108 as part of the Executable code 106, which function is to produce serialized information representing both the structure and the values of data to be stored in the Memory 103. This is shown FIG. 2, with a series translating the data and data structure of the first example above, according to the present technology. As seen FIG. 2, on line 201 are indicated, for the successive information fields, a descriptor for the field content, and on line 202, the actual content value of the corresponding field, according to the first example above. The series may be transmitted to the Memory 103 from left to right for example. It is to be noted that the method and system according to the present technology are endianness-agnostic, it being sufficient that the Serializer 108 and the Deserializer 109 support the same endianness.

Fields 203 represent the total size of the series of data. According to the present technology, one parameter needs to be predetermined, and fixed for all versions of a given firmware: a number R of bytes used for encoding the information of the total size of the series of data; let us assume here R=2 bytes. The person skilled in the art will appreciate that other R values may be adopted without departing from the present technology.

The values for fields 203 for the first example above, as shown on line 202, are binary 0x00 0x0E or 15, i.e. the total size of the series of data is 15 bytes.

Field 204 represents the size of the data $D_1$. The number of bytes used for encoding the information of the size of the data $D_1$ is 1 in the example. As will be appreciated by the person skilled in the art, this number may be higher than 1. The value for field 204 for the first example above, as shown on line 202, is binary 0x01 or 1, i.e. the size of the data $D_1$ is 1 byte.

Field 205, on 1 byte in this example as prescribed by the value for field 204, represents the value of the data $D_1$. The value for field 205 for the first example above, as shown on line 202, is binary 0xFF or 255, the value of $D_{11}$ (i.e.: first and sole byte of $D_i$).

Field 206 represents the size of the data $D_2$. The number of bytes used for encoding the information of the size of the data $D_2$ is 1 in the example.

The value for field 206 for the first example above, as shown on line 202, is binary 0x08 or 8, i.e. the size of the data $D_2$ is 8 bytes.

Fields 207, on 8 bytes in this example as prescribed by the value for field 206, represent the values of the data $D_2$. The values for fields 207 for the first example above, as shown on line 202, are successively:

binary 0x01 or 1, as the value of $D_{21}$ (i.e.: the first byte of $D_2$)
binary 0x02 or 2, as the value of $D_{22}$ (i.e.: the second byte of $D_2$)
binary 0x03 or 3, as the value of $D_{23}$ (i.e.: the third byte of $D_2$)
binary 0x04 or 4, as the value of $D_{24}$ (i.e.: the fourth byte of $D_2$)
binary 0x05 or 5, as the value of $D_{25}$ (i.e.: the fifth byte of $D_2$)
binary 0x06 or 6, as the value of $D_{26}$ (i.e.: the sixth byte of $D_2$)
binary 0x07 or 7, as the value of $D_{27}$ (i.e.: the seventh byte of $D_2$)
binary 0x08 or 8, as the value of $D_{29}$ (i.e.: the eighth byte of $D_2$)

Fields 208 represent a Cyclic Redundancy Check (CRC) that may optionally be calculated by, for example, computing system 120, based on the contents of fields 203-207, when preparing and uploading firmware to the Embedded system 110, to ensure the series of data has not been corrupted, for example during transmission on Connection 102, or during write/read operations on/from Memory 103. As will be appreciated by the person skilled in the art: if the CRC and fields 208 are omitted, the total size value of the series of data in fields 203 will be adjusted accordingly, and the CRC, while shown on 2 bytes, may be encoded on any predetermined number of bytes R', fixed for all versions of a given firmware.

The person skilled in the art will appreciate that the number of bytes used for encoding the information of the size of the data $D_i$ (i.e.: size of fields 204 and 206 in the first example) may be 2 or above without departing from the present technology.

Figure 3:
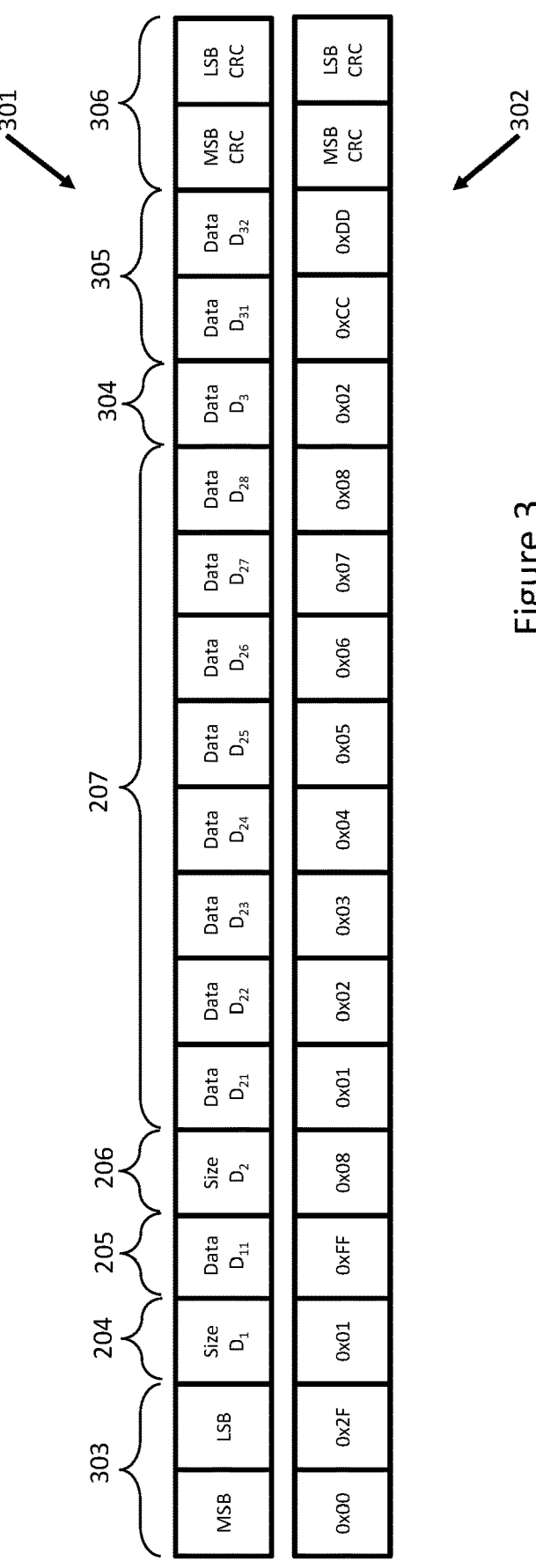
FIG. 3 illustrates an example of a modified series of data with added data, as part of a different version of the firmware.

FIG. 3 illustrates an example of a modified series of data, with added data, as part of a different version of the firmware. As a second example, let us assume a different version of the firmware uploaded to the Embedded system 110 needs to store in the Memory 103 the following data:

the same data $D_1$ and $D_2$ as in the first example, and
an additional data $D_3$, with two fields $D_{31}$ and $D_{32}$ with a value each of respectively 169 and 196.

According to the present technology, the corresponding series of data included in a different version of firmware uploaded to the Embedded system 110, may be as shown FIG. 3, where on line 301 are indicated, for the successive information fields, a descriptor for the field content, and on line 302, the actual content value of the corresponding field, according to the second example above.

Fields 303 represent the total size of the series of data, on R=2 bytes, the same as in the other version of the firmware corresponding to the first example.

The values for fields 303 for the second example above, as shown on line 302, are binary 0x00 0x2F or 18, i.e. the total size of the series of data is 18 bytes.

Fields 204 to 207 are the same as in the first example (same data $D_i$ and $D_2$).

Field 304 represents the size of a data $D_3$ added compared to the first example. The number of bytes used for encoding the information of the size of the data $D_3$ is 1 as in the previous version of the firmware.

The value for field 304 for the second example above, as shown on line 302, is binary 0x02 or 2, i.e. the size of the data $D_3$ is 2 bytes.

Fields 305, on 2 bytes in this example as prescribed by the value for field 304, represent the values of the data $D_3$.

The values for fields 305 for the second example above, as shown on line 302, are successively:

binary 0xCC or 169, as the value of $D_{31}$ (i.e.: the first byte of $D_3$)

binary 0xDD or 196, as the value of $D_{32}$ (i.e.: the second byte of $D_3$)

Fields 306 represent a Cyclic Redundancy Check (CRC) that may optionally be calculated by for example, computing system 120, based on the contents of fields 303, 204-207, 304-305 when preparing and uploading firmware to the Embedded system 110, to ensure the series of data has not been corrupted, for example, example during transmission on Connection 102, or during write/read operations on/from Memory 103.

Figure 4:
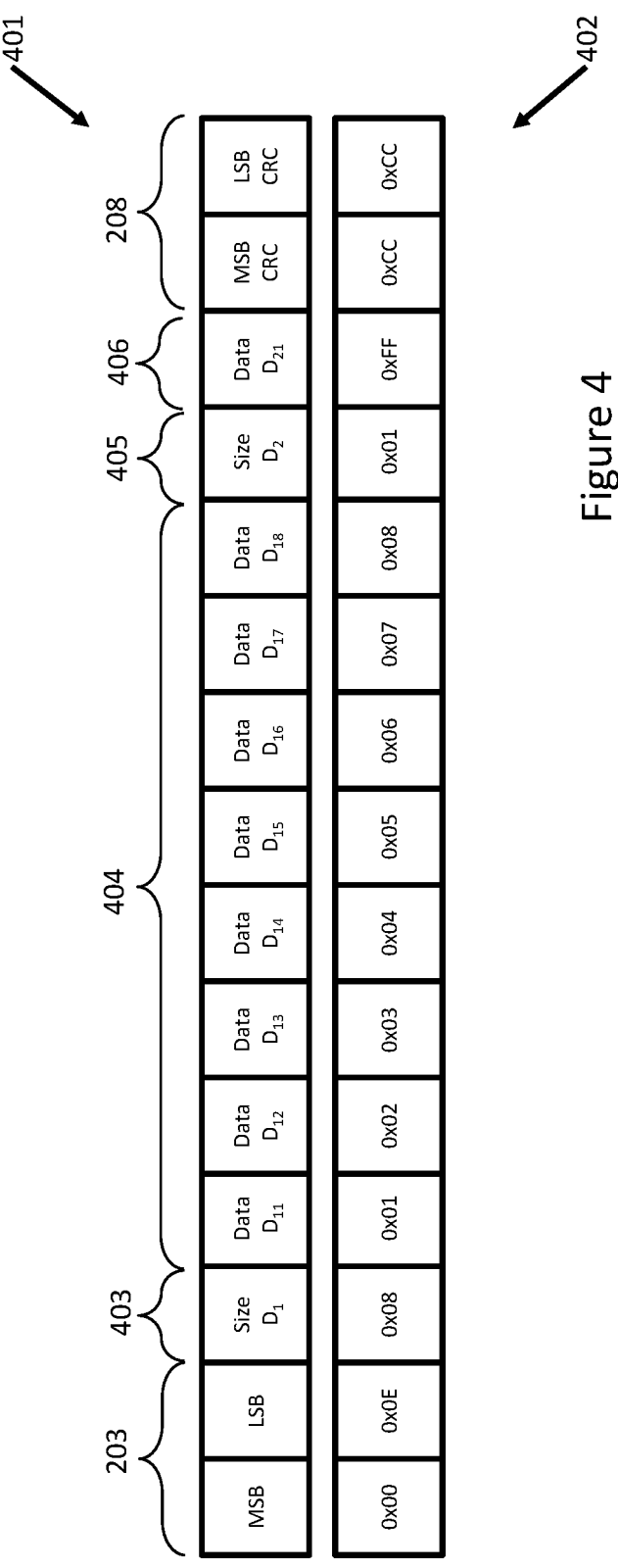
FIG. 4 illustrates an example of a modified series of data with inverted data, as part of a different version of the firmware.

FIG. 4 illustrates an example of a modified series with inverted data, as part of a different version yet of the firmware. As a third example, let us assume a different version of the firmware uploaded to the Embedded system 110 needs to store in the Memory 103 the same data values of $D_1$ and $D_2$ as in the first example, but in an inverted order (i.e.: the values for $D_1$ as those of $D_2$ of the first example, and the values for $D_2$ are those of $D_1$ of the first example), i.e. with a different data structure.

According to the present technology, the series of data as part of a different version of firmware uploaded to the Embedded system 110, may be as shown FIG. 4, where on line 401 are indicated, for the successive information fields, a descriptor for the field content, and on line 402, the actual content value of the corresponding field, according to the second example above.

Fields 203 represent the total size of the series of data, on R=2 bytes, the same as in the other version of the firmware corresponding to the first example.

The values for fields 203 for the third example above, will be the same as on the first example above, i.e., as shown on line 402, binary 0x00 0x0E or 15, i.e. the total size of the series of data is also 15 bytes.

Field 403 represents the size of the data $D_i$, and is equivalent to the field 206 in the first example. Conversely:

fields 404 are equivalent to fields 207 in the first example
   field 405 is equivalent to field 204 in the first example
   field 406 is equivalent to field 205 in the first example Fields 208 if present, will be the same as in the first example (identical CRC for merely inverted data).

As is known to the person skilled in the art, in all three examples, and in the general case, to produce serialized information representing both the structure and the values of data to be stored in the Memory 103, the Serializer 108 may be sequentially fed by the rest of the Executable code 106, the data values to be serialized, and their associated size, up to a maximum number of data. Based on that received information, the Serializer 108 may concatenate values and sizes into a series of bytes, which together with the information of total size, forms the series of data as exemplified above. The Serializer 108 may further calculate, and append to the series of bytes, a CRC representative of the content of the series of bytes. A CRC calculation and appending is optional but if implemented increases robustness of the data storing and retrieval process.

The Deserializer 109 may provide the inverse function of retrieving Data 107, deserializing them and providing them to the rest of the Executable code 106. In doing so, if a CRC is calculated and appended by the Serializer 108, then the Deserializer 109 may calculate a CRC' for the retrieved series of data, and compare it with the CRC calculated and stored as part of the Data 107 by the Serializer 108. If the two CRC and CRC' do not match, it means an error occurred in either or both of the processes of serialization or deserialization, or of storing Data 107 into, or retrieving Data 107 from, the Memory 103. An alert may then be raised by the Deserializer 109 to the rest of the Executable code 106. Mitigation and/or recovery techniques in relation to such corrupted data are known to the person skilled in the art.

Thus, according to the present technology as detailed below, a method and system are provided allowing to map data values and structure by an executable code onto an unstructured memory within an embedded system, in a manner that allows addition, deletion, or a different order, of data in the structure, and alteration of data values, while ensuring compatibility between successive versions of a firmware hosting the executable code and uploaded to the embedded system, and with external systems that may attempt to update data values.

FIG. 5 provides an example of a method that may be used by Serializer 108 to handle data input by the rest of Executable code 106, and transform them into a series of data that may be written onto Memory 103. As will be appreciated by the person skilled in the art, this is merely an example of how the serialization function may be performed.

At step 501, an indicium i for the data $D_i$ to be serialized, may be set to one.

At step 502, the Serializer 108 may receive from the rest of Executable code 106 the information of the size $S_1$ of $D_1$ (the first data to serialize). An indicia j for the data value $D_{ij}$ of the first data $D_1$ to be serialized, may be set to one.

At step 503, the Serializer 108 may receive from the rest of Executable code 106 the information of the value of $D_{11}$ (the first chunk of the data $D_1$ to serialize).

At step 504, a check may be made whether the value of indicia j is equal to that of $S_1$:

if so: indicia i may be incremented by one at step 506, and at step 507, a check may be made whether another data $D_i$ is to be received from the rest of Executable code 106: if so, a loop back may be made to step 502 for data $D_2$, if not branch may be made to step 508;

if not: indicia j may be incremented by one at step 505, and a loop back may be made to step 503 for the information of the value of $D_{12}$ (the second chunk of the data $D_1$ to serialize).

At step 508, the Serializer 108 now has the information of the value of all chunks $D_{ij}$ for each of the data $D_i$, as well as the value of the size $S_i$ for each of the data $D_i$, and therefore may:

calculate a total size $S_{tot}$ for the series of bytes representing successively for each data $D_i$, a succession of respectively the value of the size $S_i$ of the data $D_i$, and the values of the chunks $D_{ij}$ for all j from 1 to $S_i$ for the data $D_i$, plus R bytes;

write in Memory 103 successively:

the total size $S_{tot}$ for the series of data, on the first R bytes; then for all values of j, the values of chunks $D_{ij}$ for respectively the data $D_i$ for each of all values of i.

Optionally (not shown on FIG. 5), the Serializer 108 may calculate a CRC value for the series of data to be written in Memory 103, and append that CRC value to the series of data written in Memory 103. It will be apparent to the person skilled in the art that, in such a case, $S_{tot}$ has to also account for the added data to the series, and the CRC value may be written on any predetermined number of bytes.

Optionally (not shown on FIG. 5), a CRC value for the series of data may be calculated by the rest of the Executable code 106, and provided to Serializer 108 to be appended to the series of data written in Memory 103.

Optionally (not shown on FIG. 5), the size of the series of data $S_{tot}$ may be provided by the rest of Executable code 106 to the Serializer 108, and not calculated by the Serializer 108 itself.

FIG. 6 provides an example of a method that may be used by Deserializer 109 to read data from Memory 103, and transform them into information of sizes of data, and data values, that may be handled by the rest of Executable code 106. As will be appreciated by the person skilled in the art, this is merely an example of how the deserialization function may be performed.

At step 601, an indicium i for the data $D_i$ to be deserialized, may be set to one, and an indicia k for the byte position in a series of data to be deserialized, may also be set to one. The total size $S_{tot}$ for the series of data, may be read from Memory 103 on the first R bytes of the series.

At step 602, the Deserializer 109 may read from Memory 103 on the first byte after the R bytes, the size $S_1$ of $D_1$ (the first data to deserialize). An indicia j for the data value $D_{1j}$ of the first data $D_1$ to be deserialized, may be set to one.

At step 603, the Deserializer 109 may read from Memory 103 on the first byte after the R+1 bytes, the value of $D_{11}$ (the first chunk of the data $D_1$ to deserialize).

At step 604, a check may be made whether the value of indicia j is equal to that of $S_i$:

if so: branch may be made to step 606;

if not: indicia j may be incremented by one at step 605, and a loop back may be made to step 603 for the value of $D_{12}$ (the second chunk of the data $D_1$ to deserialize).

At step 606, a check may be made whether the number of bytes (R+i+j) already read from Memory 103, equals to that of the total number of bytes $S_{tot}$ of the series of data to be deserialized:

if not: at step 607:

indicia k may be set to (i+j+1), i.e. (R+i+j) bytes of the series of data have already been read and processed, and the next position in the series for the Deserializer 109 to process (at step 602, see below) will be (R+i+j+1); then indicia i may be incremented by one (deserialization of the next data $D_i$);

indicia j may be reset to one (deserialization of the first chunk of the next data $D_i$), and a branch may be made to step 602.

At step 608, the Deserializer 109 has now read from Memory 103 for all values of j from 1 to $S_i$, the values of chunks $D_{ij}$ for respectively the data $D_i$ for each of all values of i, and may provide the same to the rest of Executable code 106.

Optionally (not shown on FIG. 6), Deserializer 109 may further calculate a CRC for the series of data thus read from Memory 103, and if the Serializer 108 has included a CRC as part of the series of data written to Memory 103, read that CRC from Memory 103 and compare the calculated and read CRCs, and if the two CRCs do not match, raise an alert and provide information that data has been corrupted to the rest of Executable code 106.

Optionally (not shown on FIG. 6), a CRC value for the series of data may be calculated by the rest of the Executable code 106, and if the Serializer 108 has included a CRC as part of the series of data written to Memory 103, compare the calculated and included CRCs.

Optionally (not shown on FIG. 6), the size of the series of data $S_{tot}$ may be provided by the Derializer 109 to the rest of Executable code 106. This may for example allow the Executable code 106 to perform additional coherency checking on the data sent by the Derializer 109.

With the method and system described above, a system external to the Embedded system 110, may also update Data 107, even without being aware of the data structure. For example, Executable code 106 may receive a command (including for example through Input/output interface 104) from the external system to update a particular data, in which case the Executable may update accordingly data sent to Serializer 108, which may be handled according to the method of FIG. 5, for writing the updated Data 107 into Memory 103.

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should further be expressly understood that not all technical effects mentioned herein need to be enjoyed in each and every aspect of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. An embedded system comprising at least one processor and memory, wherein the memory comprises executable code for operating the embedded system and a data structure for storing data, and wherein the embedded system comprises a serializer for writing data to the data structure and a deserializer for reading the data from the data structure, wherein the serializer is configured to:

receive from the executable code, with i ranging from 1 to a first maximum number of data:

the size, $S_i$, of a data, $D_i$, the size $S_i$ corresponding to a number of chunks, $D_{ij}$, forming the data $D_i$, with j ranging from 1 to $S_i$; and for each data $D_i$, the value for each of the chunks $D_{ij}$;

form a first series of bytes, obtained through concatenation of successively $S_i$ and $D_{ij}$, with j ranging from 1 to $S_i$, for i ranging from 1 to the first maximum number of data;

calculate a total size, $S_{tot}$, as the sum of bytes in the formed first series of bytes, plus R bytes, R being a predetermined number of bytes; and write to the memory, successively $S_{tot}$ on R bytes and the formed first series of bytes, thereby forming the data structure, and wherein the deserializer is configured to:

read from the memory, successively a total size $S'_{tot}$ on first R bytes, and a second series of bytes on next $(S'_{tot}-R)$ bytes;

deconcatenate the second series of bytes into successively a size, $S'_i$, of a data, $D'_i$, the size $S'_i$ corresponding to a number of chunks, $D'_{ij}$, forming the data $D'_i$, with j ranging from 1 to $S'_i$, and values of the chunks $D'_{ij}$ for the data $D'_i$, with i ranging from 1 to a second maximum number of data; and send to the executable code, the size $S'_i$ of each data $D'_i$, and for each data $D'_i$, the values for each of the chunks $D'_{ij}$ forming the data $D'_i$, with j ranging from 1 to $S'_i$, for all i respectively.

2. The system of claim 1, wherein the serializer is further configured to:

add to the total size $S_{tot}$ a number of bytes, R', R' being a predetermined number of bytes;

calculate a CRC on the total size $S_{tot}$ on R bytes, and the formed series of bytes; and append the CRC on R' bytes, to the total size $S_{tot}$ on R bytes, and the formed series of bytes written to the memory.

3. The system of claim 1, wherein the executable code comprises a first version of a firmware and wherein a subsequent second version of the firmware is uploaded to the embedded system whereby the maximum number of data is modified.

4. The system of claim 1, wherein the executable code comprises a first version of a firmware and wherein a subsequent second version of the firmware is uploaded to the embedded system whereby the sizes $S_i$, the data $D_i$, and the values of the chunks $D_{ij}$ are identical to those transmitted to the serializer by the executable code of the first version of the firmware, but the order in which they are transmitted to the serializer by the executable code of the second version of the firmware is different.

5. The system of claim 1, wherein a second external system transmits to the executable code a data, $D'_i$, of a size, $S'_i$, corresponding to a number of chunks, $D'_{ij}$, the serializer being further configured to receive, from the executable code, with i ranging from 1 to the maximum number of data:

the size $S_i$ of the data $D_i$, and the value for each of the chunks $D_{ij}$;

wherein for one of the i, the size $S_i$ of the data, $D_i$, and the value for each of the chunks $D_{ij}$ is replaced by the size $S'_i$ of the data $D'_i$, and the value for each of the chunks $D'_{ij}$.

6. The system of claim 1, further configured to:

read at the deserializer, from the memory, a CRC on a predetermined number of bytes, R', after the series of bytes;

calculate a CRC' on the total size $S_{tot}$ on R bytes, and the series of bytes; and compare the values of the read CRC and the calculated CRC', and if they are not identical, raise an alert.

7. The system of claim 6, wherein the calculating the CRC', the comparing the values of the read CRC and the calculated CRC', and the raising an alert, is performed at the deserializer.

\* \* \* \* \*